United States Patent
Secatch

(10) Patent No.: US 8,356,125 B1
(45) Date of Patent: Jan. 15, 2013

(54) METHOD AND APPARATUS FOR PROVIDING A CHANNELIZED BUFFER

(75) Inventor: Stacey Secatch, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 542 days.

(21) Appl. No.: 12/121,642

(22) Filed: May 15, 2008

(51) Int. Cl.
G06F 5/00 (2006.01)
(52) U.S. Cl. ......................................................... 710/52
(58) Field of Classification Search ...................... 710/52
See application file for complete search history.

(56) References Cited

U.S. PATENT DOCUMENTS

| | | | | |
|---|---|---|---|---|
| 4,878,197 A | * | 10/1989 | Nay et al. | 710/54 |
| 5,917,821 A | * | 6/1999 | Gobuyan et al. | 370/392 |
| 5,999,533 A | * | 12/1999 | Peres et al. | 370/395.4 |
| 6,521,994 B1 | * | 2/2003 | Huse et al. | 257/724 |
| 2002/0152352 A1 | * | 10/2002 | Ikegai et al. | 711/108 |
| 2004/0121748 A1 | * | 6/2004 | Glaza | 455/151.1 |

OTHER PUBLICATIONS

Alfke, Peter, *Synchronous and Asynchronous FIFO Designs*, XAPP 051, Sep. 17, 1996 (Version 2.0), pp. 1-12, Xilinx, Inc., San Jose, California, USA.

* cited by examiner

*Primary Examiner* — Henry Tsai
*Assistant Examiner* — Juanito Borromeo
(74) *Attorney, Agent, or Firm* — Kin-Wah Tong

(57) ABSTRACT

In one embodiment, a device is disclosed. For example, in one embodiment of the present invention, the device comprises a first memory stage for storing a plurality of pointer values associated with a plurality of buffers, wherein the plurality of buffers is associated with a plurality of logical channels. The device further comprise a second memory stage, wherein an access address to the second memory stage is formed from a concatenation of one of the plurality of pointer values and a channel number corresponding to one of the plurality of logical channels.

20 Claims, 4 Drawing Sheets

METHOD AND APPARATUS FOR PROVIDING A CHANNELIZED BUFFER

FIELD OF THE INVENTION

One or more aspects of the present invention relate generally to the partitioning of a memory into a plurality of buffers to support a plurality of channels.

BACKGROUND OF THE INVENTION

Various networking protocols allow a plurality of network devices to communicate over a network, e.g., a ring network. For example, Media Oriented Systems Transport (MOST) is an automotive infotainment protocol where bytes of synchronous data such as audio and video are transported in time-divisioned multiplexed frames around a ring network. The protocol is specified up to the application layer, which implies a compliant network services stack running in software. Thus, a Network Interface Controller (NIC) will allow compliancy at the application level while providing connectivity at the physical layer, e.g., an optical ring.

Generally, within each network device, a plurality of buffers can be employed to handle data associated with a plurality of channels, e.g., a plurality of audio and/or video channels. For example, FIG. 1 illustrates an architecture having a plurality of separate channel buffers (CH 0 . . . n–1 buffers) where input data is received into a multiplexer that is controlled by a channel select or channel input signal. For example, input data associated with channel 1 will be forwarded by the multiplexer into a channel 1 (CH 1) buffer. Similarly, data stored in the channel 1 buffer can be read out via a demultiplexer. However, the architecture illustrated in FIG. 1 requires a substantial amount of resources to store the pointer values and to provide the necessary buffer memory.

SUMMARY OF THE INVENTION

In one embodiment, a device is disclosed. For example, in one embodiment of the present invention, the device comprises a first memory stage for storing a plurality of pointer values associated with a plurality of buffers, wherein the plurality of buffers is associated with a plurality of logical channels. The device further comprises a second memory stage, wherein an access address to the second memory stage is formed from a concatenation of one of the plurality of pointer values and a channel number corresponding to one of the plurality of logical channels.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION

Figure 2:
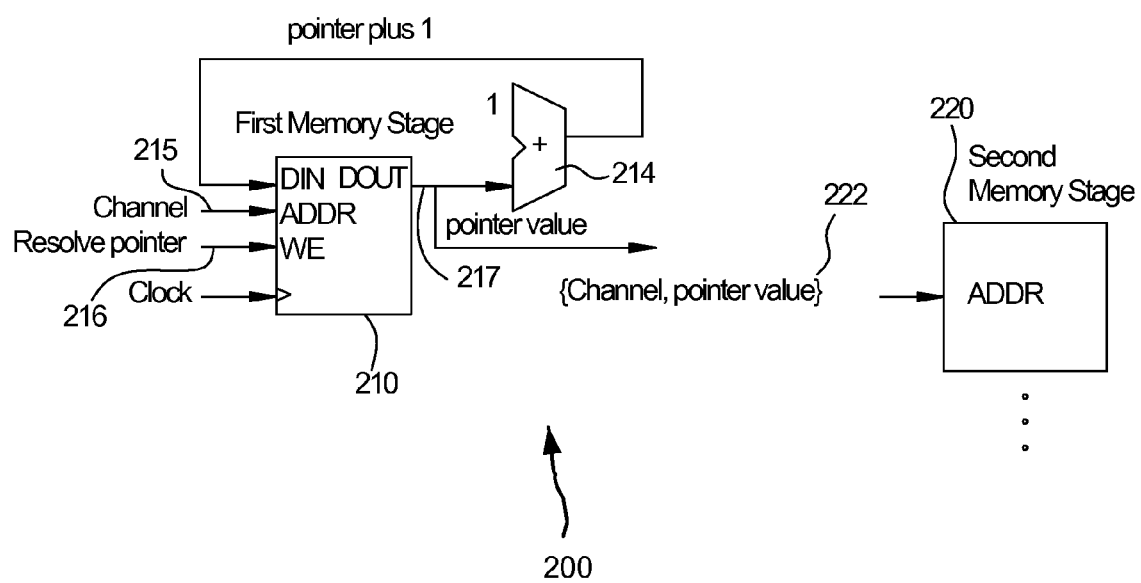
FIG. 2 illustrates an illustrative overview of a memory device in accordance with the present invention.

FIG. 2 illustrates an illustrative overview of a memory device 200 in accordance with the present invention. In one embodiment, memory device 200 comprises a first memory stage or module 210 and a second memory stage or module 220. In one embodiment, both memory stages 210 and 220 are implemented using random access memory (RAM). In one embodiment, the first memory stage is implemented using a distributed memory, and the second memory stage is implemented using block RAM. Distributed memory is broadly defined as a memory that is split up into segments, where each of the segments may be directly accessed, whereas block random access memory is broadly defined as a block of embedded memory where data can be accessed in random blocks. Furthermore, in some Field Programmable Gate Array (FPGA) implementations, distributed memories are built using look up tables (LUTs), whereas block RAMs use dedicated RAM resources. As further described below, the first memory stage 210 (e.g., for storing only pointer values associated with a plurality of channels) is significantly smaller in size than the second memory stage 220 (e.g., for storing the actual data associated with all the channels). Given this difference in size, in one embodiment, it is advantageous to implement the first memory stage using a distributed memory and to implement the second memory stage using block RAM.

In one embodiment, the memory device 200 is implemented as a dual-port device that allows for simultaneous accesses from two ports. Furthermore, the memory device 200 may also permit width conversion if dual-port is implemented. Namely, the data memory may have different data widths on the read and write ports. Furthermore, those skilled in the art will realize that a dual-port device will allow, if desired, access to two different buffers in the memory device at the same time.

Figure 1:
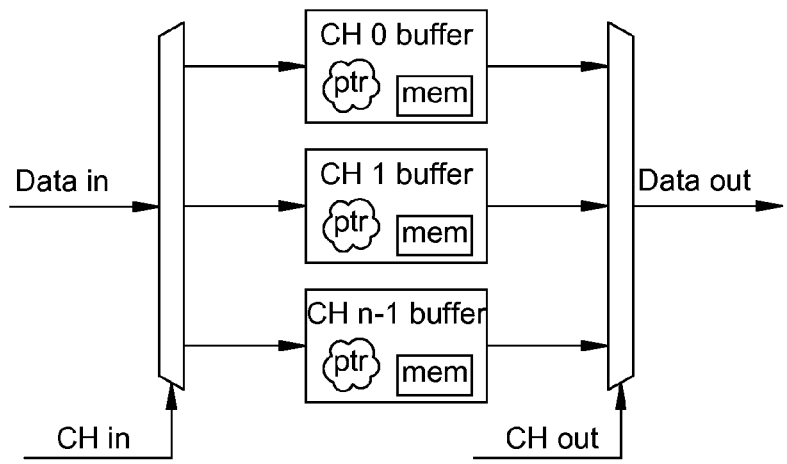
FIG. 1 illustrates a prior art memory architecture.

In brief, the memory device 200 permits a logical channel select signal to be used as an address into the first memory stage 210, thereby enabling the use of a single set of read and write pointer incrementer circuitry, while still allowing access to all the logical channels (e.g., a plurality of data, video or audio channels). In other words, the memory device 200 provides greater efficiency over the prior art architecture as illustrated in FIG. 1 by reducing memory resource consumption, enabling channelized access, and alleviating routing congestion. For example, the channel muxing stages as illustrated in FIG. 1 can be removed because these addressing multiplexers are no longer required given the built-in accessing mechanisms (i.e., address lookup mechanisms) of the two memory stages (e.g., distributed memory and block RAM). Furthermore, routing congestion is reduced since there are no large multiplexers in the fabric, i.e., the various data path signals associated with the multiplexers will be omitted.

In one embodiment, the memory device 200 allows channelized access by using a first memory stage (e.g., distributed memory) to look up the correct pointer for any given logical channel. More specifically, read and write pointer values for all of the logical channels are stored in the first memory stage or module 210. To illustrate, a channel select signal is received by an address (ADDR) interface 215 and a pointer resolve signal (read or write) is received by a write-enable (WE) interface 216 of the first memory stage or module 210. In turn, the first memory stage or module 210 provides the corresponding pointer value via data out (DOUT) interface 217. For example, the input signals may comprise specifying a logical channel 6 for a read operation, and the like. In turn, the read pointer value for channel 6 is provided at interface 217. It should be noted that the corresponding pointer value produced on interface 217 is also provided to an arithmetic logic unit 214 (e.g., an incrementer) for adding a (1) value to the pointer value which is then returned to the first memory stage or module 210. In turn, the pointer value from the first memory stage or module 210 is used in conjunction (e.g., concatenated) with the channel select signal as a block RAM access address 222. It should be noted that although not specifically shown in FIG. 2, two first memory stages will be required (e.g., one module for write and one module for read).

As illustrated in FIG. 2, the first step is to use the channel select signal to look up a current pointer value. In one embodiment, the channel number is then concatenated with the pointer value for that channel to create a complete block RAM address. In addition, every pointer read from the first memory stage 210 is fed into the incrementer 214 and the result automatically overwrites the current pointer value, which allows a complete step through the memory device 200. Once the pointer reaches a maximum pointer value, it will automatically roll around to the start of the channel buffer.

Figure 3:
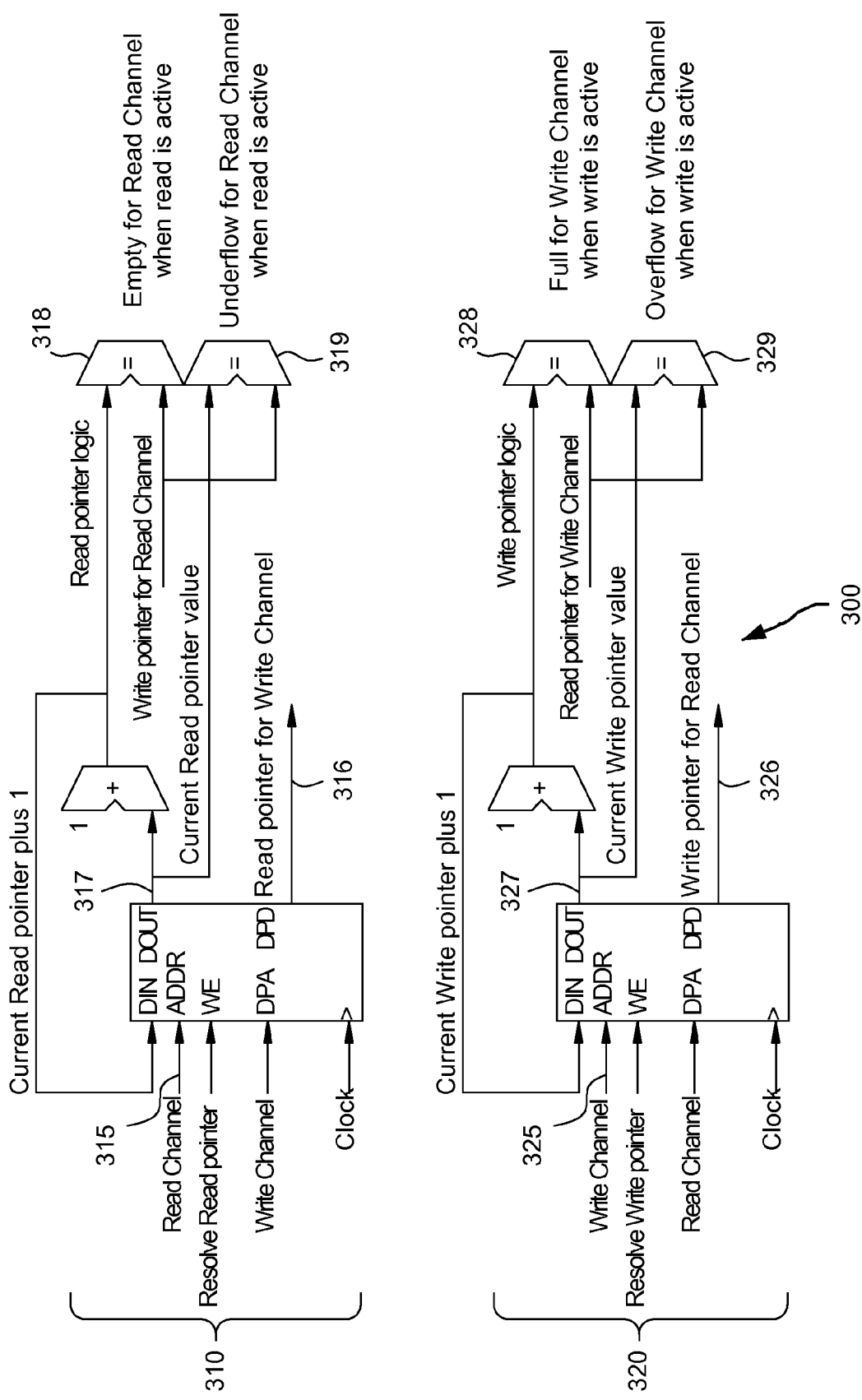
FIG. 3 illustrates an illustrative overview of a memory device with status flag generation in accordance with the present invention.

FIG. 3 illustrates an illustrative overview of a memory device 300 with status flag generation for one or more potential conditions (e.g., underflow, overflow, full or empty) in accordance with the present invention. Namely, memory device 300 is a modification of the memory device 200 as disclosed above to provide the ability to provide one or more status flags that reflect one or more conditions, e.g., potential error conditions. More specifically, for the read pointer logic, the write channel is added, and for the write pointer logic, the read channel is added. In other words, for underflow/overflow detection or full/empty detection, each of the pointer memories can be extended to a dual port memory at the cost of one additional look up table (LUT) per bit width, where the additional address field for each transaction's active pointer is the active pointer for the other transaction.

In one embodiment, dual port memory device 300 comprises a read pointer logic portion 310 and a write pointer logic portion 320. In the read pointer logic portion 310, the current read pointer value is provided via interface 317 in response to the channel select signal on interface 315. In one embodiment, the current read pointer value plus 1 is compared with a write pointer 326 for the current read channel via a compare module 318. If the two values are equal, then there will be an empty condition for the current read channel when the read becomes active. In other words, if the next read function is performed on the channel (i.e., read becomes active), there will be no data to be read.

In one embodiment, the current read pointer value is compared with a write pointer for the current read channel via a compare module 319. If the two values are equal and a read occurs, then an underflow condition will occur. It should be noted that compare module 318 and/or compare module 319 are broadly referred to as a detection logic portion.

In the write pointer logic portion 320, the current write pointer value is provided via interface 327 in response to the channel select signal on interface 325. In one embodiment, the current write pointer value plus 1 is compared with a read pointer for the current write channel (obtained from interface 316) via a compare module 328. If the two values are equal, then there will be a full condition for the current write channel when the write becomes active. In other words, if the next write function is performed on the channel (i.e., write becomes active), there will be no room to receive the new data to be written into memory, thereby potentially overwriting other data.

In one embodiment, the current write pointer value is compared with a read pointer for the current write channel via a compare module 329. If the two values are equal and a write occurs, then an overflow condition will occur. It should be noted that compare module 328 and/or compare module 329 are broadly referred to as a detection logic portion.

Thus, in one embodiment, the memory device 300 is implemented with error condition detection capability (e.g., underflow, overflow, full or empty) in accordance with the present invention. It should be noted that memory device 300 may implement one or more of the detection logic portions for detecting one or more of the error conditions. Furthermore, in one embodiment, a full flag and an empty flag for the current channel can be generated and gated into the logic for preventing the overflow and underflow conditions by stopping the transactions when these conditions are detected.

Figure 4:
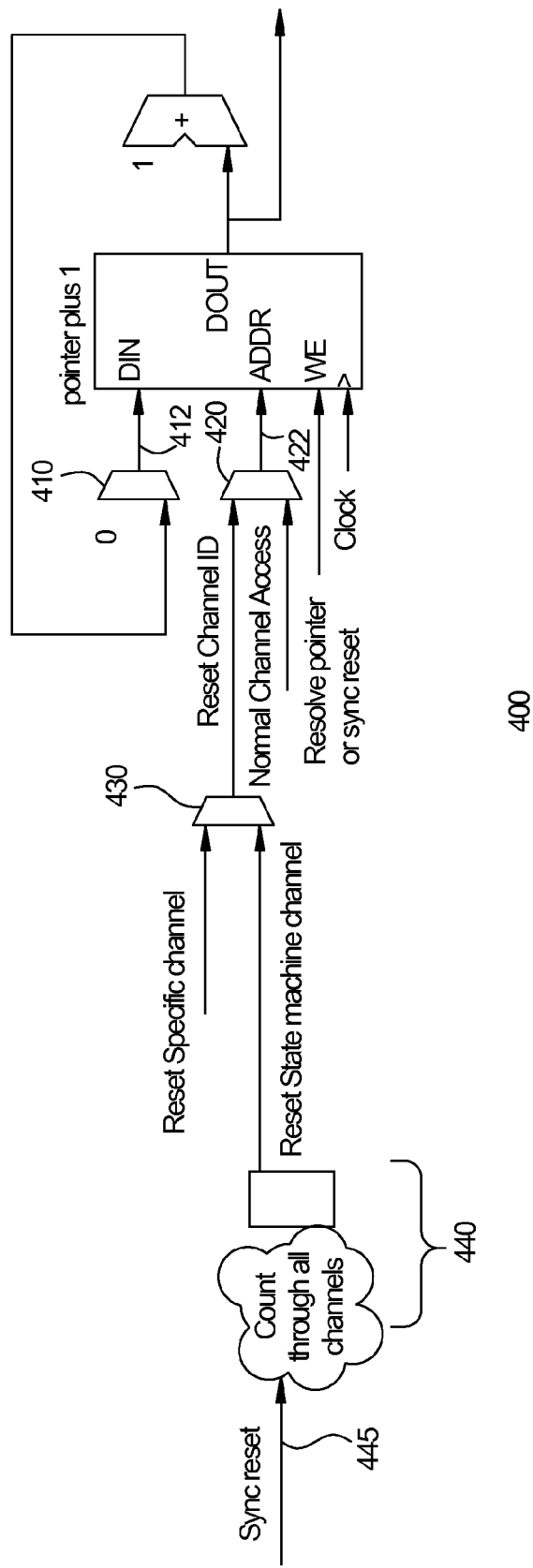
FIG. 4 illustrates an illustrative implementation of a memory device with a reset functionality in accordance with the present invention.

FIG. 4 illustrates an illustrative implementation of a memory device 400 with a reset functionality in accordance with the present invention. In one embodiment, memory device 400 provides a synchronous reset for a specific logical channel. For example, a multiplexer 410 is provided in front of the data input interface 412 for selecting between a zero value or an incremented pointer value as discussed above. The zero value will be selected for resetting a selected buffer. Similarly, a multiplexer 420 is provided in front of the channel select or access interface 422 for selecting between a channel to be reset or a channel to be accessed for a transaction (read or write) as discussed above.

In one embodiment, a multiplexer 430 is provided in front of the multiplexer 420 for selecting between a reset for a specific channel to be reset or an automatic reset of all the channels in the first memory stage (e.g., distributed memory). Namely, a state machine 440 is provided to auto-reset all the channels by stepping through all the channels if a sync reset signal 445 is received. It should be noted that one or more of the multiplexers 410, 420, and 430 and the state machine 440 are broadly referred to as a reset logic portion. In the event that full/empty indicators are used, reset should also set the empty flag for any channel that is cleared.

Figure 5:
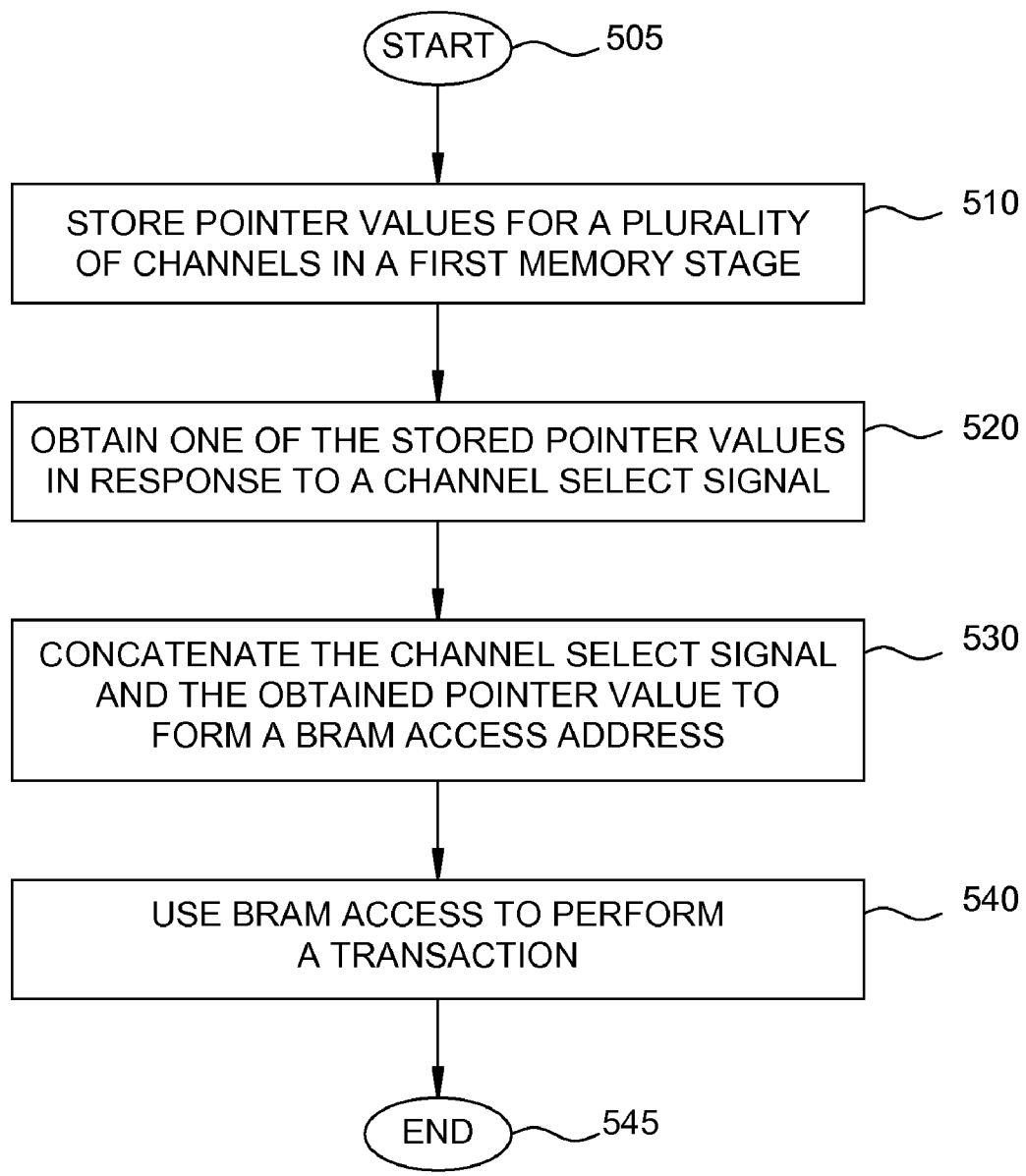
FIG. 5 illustrates a flow chart of a method for performing a transaction in a memory device in accordance with one or more embodiments of the present invention.

FIG. 5 illustrates a flow chart of a method 500 for performing a transaction in a memory device in accordance with one or more embodiments of the present invention. Method starts in step 505 and proceeds to step 510, where pointer values (e.g., read pointer values and write pointer values) for a plurality of buffers associated with a plurality of logical channels are stored in a first memory stage (e.g., distributed memory).

In step 520, method 500 obtains one of the stored pointer values in response to a channel select or channel access signal. For example, a processing element (not shown) may want to access a particular buffer associated with a particular logical channel to perform a transaction (e.g., read or write).

In step 530, method 500 concatenates the channel select signal (e.g., channel number) and the obtained pointer value to form a complete block RAM access address. In step 540, method 500 uses the block RAM access address to perform a transaction on the second memory stage (e.g., block RAM). The method ends in step 545.

In one embodiment, the present memory device (e.g., 200, 300 or 400) can be implemented in a network device, e.g., a Media Oriented Systems Transport (MOST) device. However, the present memory device is not limited to a MOST device and can be implemented in any other network devices.

Furthermore, it should be noted that embodiments of the present invention can be implemented in software and/or in a combination of software and hardware, e.g., using application specific integrated circuits (ASIC), a general purpose computer or any other hardware equivalents such as microprocessors. In one embodiment, the present method or one or more steps of the present method can be loaded into memory and executed by a processor to implement the functions as discussed above. As such, the present method or one or more steps of the present method (including associated data structures) of embodiments of the present invention can be stored on a computer readable medium, e.g., RAM memory, magnetic or optical drive or diskette and the like.

Furthermore, in one embodiment, one or more aspects of the present invention relate generally to a programmable logic device (PLD). A programmable logic device (PLD) is a general-purpose device that can be programmed by a user to implement a variety of selected functions. One type of PLD is a Field Programmable Gate Array (FPGA), which typically includes an array of configurable logic blocks (CLBs) and a plurality of input/output blocks (IOBs). The CLBs are individually programmable and can be configured to perform a variety of logic functions on a few input signals. The IOBs can be configured to drive output signals from the CLBs to external pins of the FPGA and/or to receive input signals from the external FPGA pins. The FPGA also includes a programmable interconnect structure that can be programmed to selectively route signals among the various CLBs and IOBs to produce more complex functions of many input signals. The CLBs, IOBs, and the programmable interconnect structure are programmed by loading configuration data into associated memory cells that control various switches and multiplexers within the CLBs, IOBs, and the interconnect structure to implement logic and routing functions specified by the configuration data to implement a user design in the FPGA. An FPGA may also include other programmable and non-programmable resources.

In one embodiment, one or more memory devices can be implemented on a PLD. For example, memory devices 200, 300 or 400 can be implemented on a PLD.

Furthermore, in one embodiment, one or more aspects of the present invention relate generally to an integrated circuit having a programmable portion. For example, the integrated circuit may comprise a processor with a programmable portion. As such, one or more memory device 200, 300 or 400 can be implemented on an integrated circuit having a programmable portion. For example, the memory device 200, 300 or 400 can be implemented on a programmable portion of the integrated circuit.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

What is claimed is:

1. A device, comprising:
    a first memory stage storing only a plurality of pointer values associated with a plurality of buffers, wherein said plurality of buffers is associated with a plurality of logical channels, and wherein a logical channel select signal identifying one of the plurality of logical channels is used as an access address to said first memory stage to look up one of the plurality of pointer values;
    a second memory stage comprising a block memory including the plurality of buffers, wherein an access address to said second memory stage is formed from a concatenation of the logical channel select signal and the one of said plurality of pointer values from the first memory stage; and
    a single read and write pointer incrementer circuitry that increments or decrements each of the plurality of pointer values stored in the first memory stage, wherein only the access address formed from the concatenation of the logical channel select signal and the one of said plurality of pointer values is used to access the second memory stage.

2. The device of claim 1, wherein said device is deployed within a Media Oriented Systems Transport (MOST) device.

3. The device of claim 1, wherein said plurality of logical channels comprises a plurality of data, video or audio channels.

4. The device of claim 1, wherein said device comprises a programmable logic device (PLD).

5. The device of claim 1, wherein said device is deployed within a programmable portion of an integrated circuit.

6. The device of claim 1, wherein said first memory stage comprises a detection logic for detecting an empty condition.

7. The device of claim 1, wherein said first memory stage comprises a detection logic for detecting a full condition.

8. The device of claim 1, wherein said first memory stage comprises a detection logic for detecting an underflow condition.

9. The device of claim 1, wherein said first memory stage comprises a detection logic for detecting an overflow condition.

10. The device of claim 1, further comprising:
    a reset logic portion to reset one or more of said plurality of buffers.

11. The device of claim 1, wherein said first memory stage comprises a distributed memory, and said second memory stage comprises a block random access memory.

12. The device of claim 1, wherein said device comprises a dual-port device.

13. A method for performing a transaction in a memory device, comprising:
    storing a plurality of pointer values associated with a plurality of buffers in a first memory stage, wherein said plurality of buffers is associated with a plurality of logical channels;
    obtaining one of said plurality of pointer values from the first memory stage in response to a channel number, wherein the channel number identifies one of the plurality of logical channels;
    concatenating said one of said plurality of pointer values from the first memory stage and said channel number to form a block random access memory address;
    using said block random access memory address to perform a transaction on a second memory stage, the second memory stage comprising a block memory including the plurality of buffers, wherein only the block random access memory address formed from the concatenating of the channel number and the one of said plurality of pointer values is used to access the second memory stage; and
    incrementing or decrementing said one of said plurality of pointer values in response to performing the transaction on the second memory stage, using a single read and write pointer incrementer circuitry that is configured to increment or decrement each of the plurality of pointer values stored in the first memory stage.

14. The method of claim 13, wherein said memory device is deployed within a Media Oriented Systems Transport (MOST) device.

15. The method of claim 13, wherein said plurality of logical channels comprises a plurality of data, video or audio channels.

16. The method of claim 13, wherein said memory device comprises a programmable logic device (PLD).

17. The method of claim 13, wherein said memory device is deployed within a programmable portion of an integrated circuit.

18. The method of claim 13, further comprising at least one of:

detecting an empty condition;

detecting a full condition;

detecting an underflow condition; or detecting an overflow condition.

19. The method of claim 13, further comprising:

resetting one or more of said plurality of buffers.

20. The method of claim 13, wherein said first memory stage comprises a distributed memory, and said second memory stage comprises a block random access memory.

* * * * *